Patented Dec. 25, 1951

2,579,453

UNITED STATES PATENT OFFICE 2,579,453

COMPOSITION FOR DRILLING MUDS

Earl E. Post, Pomona, and Wilbur N. Oldham, Monrovia, Calif., assignors to American Cyanamid Company, New York, N. Y., a corporation of Maine No Drawing. Application January 31, 1947, Serial No. 725,738

2 Claims. (Cl. 252—8.5)

This invention relates to improvements in materials for use in drilling wells, and is directed particularly to an improved class of materials for use in the rotary drilling of deep wells to prevent water loss from the recirculating drilling fluid into the surrounding formation. The invention includes a novel class of condensation products and methods for the preparation thereof as well as improved drilling fluids containing these condensation products in admixture with other ingredients.

In drilling oil and gas wells by the rotary drilling process it is common practice to circulate an aqueous mud-laden fluid downwardly through the drill stem of the drilling bit, across the face of the bit and upwardly through the drill hole. The circulating drilling mud serves to cool and lubricate the bit, mix with the cuttings and carry them to the surface, and also to seal off the sides of the well in order to prevent loss of water from the drilling fluid into adjacent strata. The present invention is directed particularly to the provision of a new and improved class of compounds which, when added to the drilling fluid, will assist in sealing the sides of the well and thereby in preventing water loss.

Heretofore the inorganic materials such as mica and the organic materials such as quebracho or other tannin-containing material that have been used to control water loss in drilling fluids have been insoluble or only difficultly soluble in cold water, and have required the application of heat to prepare a uniform mud suspension. This is also true in some cases when the pectate pulp described and claimed in U. S. Patent No. 2,319,705 is used. A further important advantage of the condensation products of the present invention resides in the fact that they are soluble or readily dispersible in cold water, and can therefore be incorporated uniformly into drilling muds without the application of heat.

The novel condensation products which, in accordance with the present invention, are prepared and used in aqueous drilling fluids are cold water-soluble condensation products of tannin-containing materials with methylene bodies such as formaldehyde and water-soluble formaldehyde condensation products of other resin-forming materials such as urea, thiourea, melamine and dicyandiamide. We have found that water-soluble or readily water-dispersible condensation products can be obtained from these two classes of reagents by carrying out the condensation under slightly alkaline conditions while employing considerably less of the methylene body than would be required to obtain a complete reaction with all of the tannin or other polyhydric phenolic compound present in the reaction mixture. The preferred class of tannin-containing materials for use in preparing our novel condensation products is the class of naturally occuring tannins, the preferred material being quebracho. However it will be understood that other natural tannins or tannin-containing bark extracts such as chestnut, oak, wattle, divi-divi and the like may also be used, either singly or in admixture with each other or with quebracho. In some cases, polyhydric phenols from other sources such as catechol, resorcinol, xylenol or pyrogallol may be mixed with the above or other tannin-containing materials prior to their condensation with formaldehyde, paraformaldehyde or other methylene bodies such as dimethylol urea, trimethylol melamine and the like.

As is noted above, the water-soluble condensation products of our invention are obtained by employing a large excess of the tannin-containing materials, or mixtures thereof with polyhydric phenols, as compared with the amounts theoretically necessary to combine with all of the formaldehyde or other methylene bodies present in the reaction mixture. Preferably we maintain a ratio on the order of one part by weight of 40% aqueous formaldehyde solution for each 15–20 parts by weight of quebracho extract. It is generally agreed by the authorities that the principal tannin material present in natural tannins is either digalloyl glucose or penta digalloyl glucose. Assuming the quebracho extract and other similar tanning extracts to contain about 65–70% of actual tannin, the above quantities represent a molar ratio of formaldehyde to tannin material of about 1:3, if the tannin material is in fact digalloyl glucose, or of two mols of formaldehyde per one mol of tannin if the tannin is actually present as penta digalloyl glucose. In the present specification and claims the tannin material is assumed to be digalloyl glucose, and therefore the molar ratio of 1:3 is employed, it being understood that this is the same quantity of formaldehyde that will give a 2:1 molar ratio with penta digalloyl glucose. Approximately the same ratio is maintained when other natural tannin-containing materials such as chestnut, oak, wattle and the like are employed. If polyhydric phenols are added to these natural tanning materials, about 0.25 to about 0.5 mol of formaldehyde, or corresponding quantities of other methylene-yielding materials, are added on the basis of the additional quantities of phenols in addition to those used for the natural tannin-containing materials.

In preparing the novel water-soluble or water-dispersible condensation products of our invention, the tannin-containing materials are dissolved in an aqueous alkaline solution to which the methylene-yielding substance is added and the mixture is heated, preferably at about 70°–80° C. for 2–3 hours, or until the content of free formaldehyde or other methylene-yielding agent is reduced to a low figure. In some cases it is advantageous to add ammonia or amines such as methylamine or ethylamine to the reaction mixture in order to lessen the danger of obtaining a water-insoluble product. The following preparation is typical:

To 8,000 parts of water in an open stainless steel pot equipped with an agitator and adapted for heating is added 80.8 parts by weight of sodium hydroxide and the resulting 1% caustic solution heated to 75°–80° C. To the stirred solution is added 2,400 parts by weight of quebracho extract. After solution is complete, which requires about one hour, there is added 120 parts of 40% commercial formaldehyde and the stirring and heating at 75°–80° C. continued for 2–3 hours. At this concentration no exotherm is noted although at 50% solids the reaction is slightly exothermic. The mixture, while hot, remains liquid at this concentration and can be easily discharged at the end of the heating period into any convenient container. On cooling the mixture sets to a soft gel which is easily soluble in cold water and can itself also be liquified by reheating.

In the above preparation, paraformaldehyde or hexamethylenetetramine may be substituted for the formaldehyde and chestnut, oak, wattle, divi-divi or other tanning extract may be substituted for the quebracho. The final product contains about 23% of quebracho or other natural tannin-containing material, but smaller quantities of water may be used with the formation of a more concentrated product. Sufficient caustic should be employed to obtain a pH of at least 8, and preferably about 8.5, although similar products are obtained when higher pH values are employed.

Essentially the condensation products of our invention are similar in character to the natural tannin-containing materials from which they were prepared, but are of considerably increased molecular weight, usually about two or three-fold and are water-soluble. This increased molecular weight is of great value in enhancing the wall-building properties of these materials in drilling fluids, since the condensation products possess greatly improved sealing properties and effectively prevent the loss of water from drilling muds into the surrounding formations. Ordinarily they are added to the aqueous drilling fluids in quantities of about 0.5–5 pounds per barrel, although they may be used in slightly higher concentrations in some cases, such as, for example, in amounts up to 7–8 pounds per barrel.

In addition to the fact that the condensation products of our invention are easily soluble in cold water, thus avoiding waste and making the use of such pastes very attractive on power rigs where steam is not available, our products possess a number of additional important advantages. Because of their increased molecular weight, and correspondingly improved sealing and wall-building characteristics, they can be used in lower concentrations in the drilling fluid than ordinary quebracho or other vegetable extract, while obtaining similar results. They are more stable at elevated temperatures, and can therefore be used successfully in wells where considerable heat is encountered. Finally, they are exceptionally well suited for admixture with the pectates described in U. S. Patent No. 2,319,705, referred to above, and the preparation of aqueous drilling muds containing these two classes of materials constitutes an important feature of our invention.

As is noted above, results similar to those obtained with the formaldehyde condensation products of tannin-containing materials can also be obtained with water-soluble condensation products of urea, thiourea, melamine and other aminotriazines, dicyandiamide, pentaerythritol and other compounds which form resins by condensation with formaldehyde, paraformaldehyde or other methylene-yielding bodies. Typical compounds of this class which may be used are dimethylol urea, trimethylol melamine, tetramethylol melamine, dimethylol formoguanamine, dimethylol acetoguanamine, dimethylol dicyandiamide, dimethylol thiourea and the like. Inasmuch as urea, thiourea and dicyandiamide are important drilling mud reagents for use in viscosity control, as described in U. S. Patents Nos. 2,280,994 and 2,280,995, it is evident that mixtures of these compounds with their formaldehyde condensation products may be used, either as such or in admixture with sodium tetraphosphate or tetrasodium pyrophosphate or both, to obtain simultaneously a reduction in viscosity and in water loss during rotary drilling.

The results obtained in commercial drilling operations by the addition of the water-soluble formaldehyde condensation products of tannin-containing materials are illustrated in the following specific examples.

*Example 1*

Water loss tests were run on samples of a water suspension of McKittrick heavy rotary drilling clay of 1.23 specific gravity to which one-half pound per barrel of sodium tetraphosphate or tetrasodium pyrophosphate had been added. The tests were made on a standard 100-pound wall building tester, which consists of a 3-inch closed pressure filter connected with a compressed nitrogen tank and provided with a graduate for measuring the volume of filtrate. Using 100 pounds gage pressure on the filter the following results were obtained at room temperature after adding the reagents indicated, the quebracho-formaldehyde being that obtained by the specific method described above.

| Reagent | Lbs./Bbl. | Phosphate | Water Loss, ml. | | Cake thickness |
|---|---|---|---|---|---|
| | | | 0.5 Hour | 1 Hour | |
| | | | | | Inches |
| None | | STP | 14.3 | 23.5 | 9/32 |
| Quebracho | 1 | STP | 13.4 | 21.8 | 5/32 |
| Do | 3 | STP | 12.6 | 20.7 | 3/32 |
| Quebracho-CH₂O | 1 | STP | 14.0 | 22.1 | 4/32 |
| Do | 3 | STP | 10.6 | 16.3 | 3/32 |
| None | | TSPP | 12.6 | 23.1 | 5/32 |
| Quebracho | 1 | TSPP | 11.8 | 21.1 | 7/32 |
| Do | 3 | TSPP | 10.6 | 18.6 | 9/32 |
| Quebracho-CH₂O | 1 | TSPP | 11.1 | 18.1 | 4/32 |
| Do | 3 | TSPP | 9.3 | 14.3 | 4/32 |

*Example 2*

Rogers Lake rotary drilling clay was thoroughly hydrated and an aqueous drilling mud made having a specific gravity of 1.23. Hexasodium tetraphosphate was added in an amount equivalent to 0.25 pound per barrel and samples of the mud were tested as in Example 1 after adding quebracho or the quebracho-formaldehyde condensation product previously described. The following results were obtained:

| Reagent | Lbs./Bbl. | Water Loss, ml. | | Cake thickness |
|---|---|---|---|---|
| | | 0.5 Hour | 1 Hour | |
| None | | 12.6 | 19.1 | Inches 2/32 |
| Quebracho | 1 | 12.4 | 18.4 | 2/32 |
| Do | 5 | 9.8 | 14.6 | 1/32 |
| Quebracho-CH₂O | 1 | 11.2 | 17.0 | 1/32 |
| Do | 5 | 10.2 | 14.2 | 1/32 |

*Example 3*

The quebracho-formaldehyde condensation product was added to the drilling mud in drilling an oil well in the Paloma field in California in which high temperatures (110° F. to 150° F. at the flow line) were encountered. This well was drilled to a depth of 9100 feet with the use of regular quebracho, sodium tetraphosphate and tetrasodium pyrophosphate. The average water loss was 12.5 cc. per one-half hour with about 2 pounds per barrel of regular quebracho being maintained in the mud. This amounted to about 250 to 300 pounds addition of quebracho every 24 hours of drilling time.

At 9100 feet fresh mud was substituted containing 2 pounds per barrel of the quebracho-formaldehyde condensation product as the only water-loss controlling reagent. An immediate improvement in water loss was noted; the average from 9100 feet to 10,700 feet being 8.8 cc. per one-half hour with a tough 2/32" to 3/32" wall cake. Small quantities of sodium tetraphosphate and tetrasodium pyrophosphate were added to control the viscosity, and the pH of the mud was constant at about 8.5 to 8.6. During this stage of the drilling the flow line temperature was 143° F., but no adverse effects on gel strength or viscosity of the mud were caused by the quebracho-formaldehyde condensation product.

What we claim is:

1. A drilling fluid comprising an aqueous clay dispersion containing, as a water loss-controlling agent, a cold water-soluble condensation product obtained by condensing at least three molar equivalents of a natural cold water-insoluble quebracho, based on the digalloyl glucose content thereof, with a quantity of formaldehyde which is less than 1 mol but sufficient to form a cold water-soluble condensation product, the condensation being carried out in aqueous solution at a temperature of about 70–80° C. and a pH of at least 8.

2. A water loss-controlling reagent for aqueous drilling muds consisting of the product obtained by condensing at least three molar equivalents of a natural cold water-insoluble quebracho, based on the digalloyl glucose content thereof, with a quantity of formaldehyde which is less than one mol but sufficient to form a cold water-soluble condensation product, the condensation being carried out in aqueous solution at a temperature of about 70–80° C. and a pH of at least 8, said product being characterized by its solubility in cold water and by an increased molecular weight but being otherwise similar in character to the quebracho from which it was prepared.

EARL E. POST.
WILBUR N. OLDHAM.

REFERENCES CITED

The following references are of record in the file of this patent:

UNITED STATES PATENTS

| Number | Name | Date |
|---|---|---|
| 2,190,672 | Merharg | Feb. 20, 1940 |
| 2,319,705 | Post | May 18, 1943 |
| 2,331,281 | Wayne | Oct. 12, 1943 |
| 2,352,468 | Burnam | June 27, 1944 |
| 2,356,302 | Chapman | Aug. 22, 1944 |
| 2,393,273 | Wayne | Jan. 22, 1946 |

FOREIGN PATENTS

| Number | Country | Date |
|---|---|---|
| 353,872 | Great Britain | July 23, 1931 |
| 590,321 | Great Britain | July 15, 1947 |

OTHER REFERENCES

Adams et al.: J. Soc. Chem. Ind. Trans., January 11, 1935, page 1, T.